2,957,101

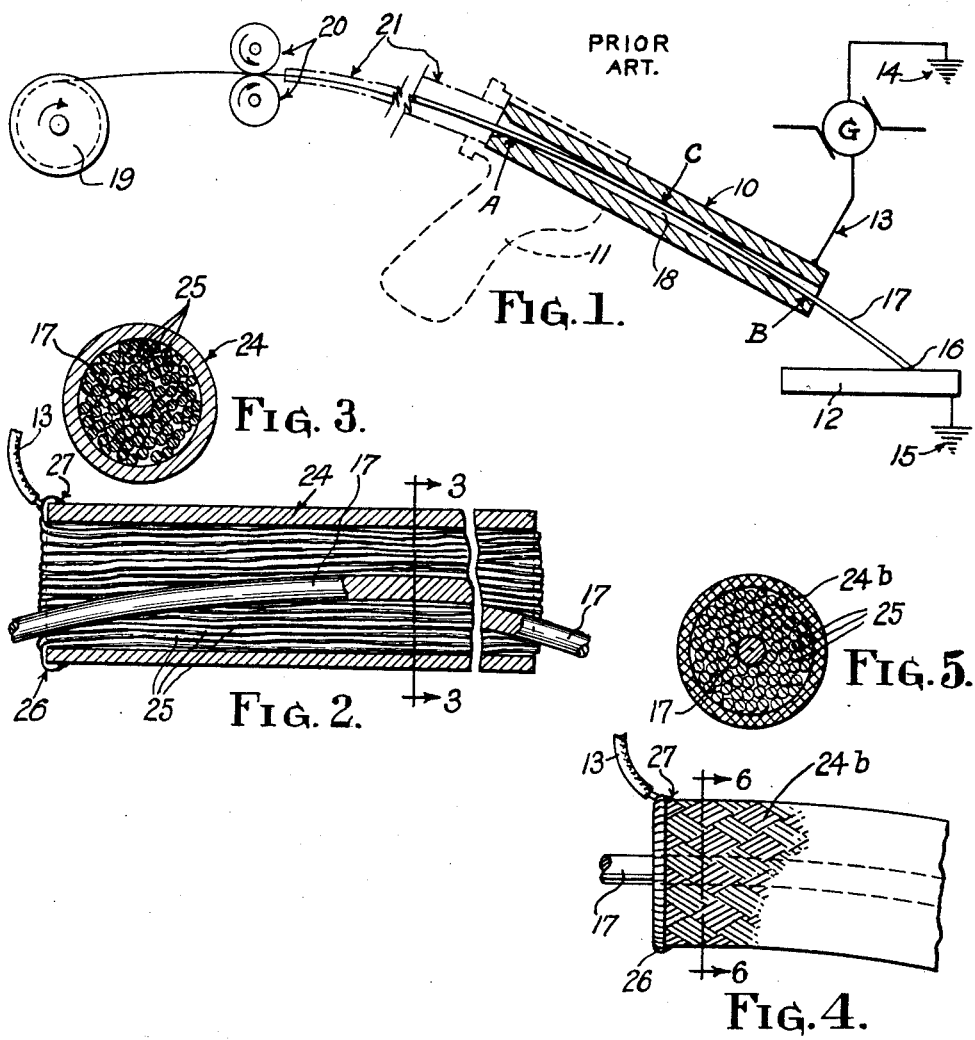
Oct. 18, 1960    C. R. BARKLEY    2,957,101
ELECTRICAL CONTACTOR DEVICE FOR CONTINUOUS FEED, CONSUMABLE
ELECTRODE-TYPE WELDING APPARATUS
Filed June 18, 1957
INVENTOR
*Charles Rex Barkley*
BY
ATTORNEY "# United States Patent Office 2,957,101
Patented Oct. 18, 1960

ELECTRICAL CONTACTOR DEVICE FOR CONTINUOUS FEED, CONSUMABLE ELECTRODE-TYPE WELDING APPARATUS

Charles Rex Barkley, New Lexington, Ohio, assignor to Evans Reamer and Machine Company, New Lexington, Ohio, a corporation of Ohio Filed June 18, 1957, Ser. No. 666,292

1 Claim. (Cl. 314—129)

The present invention relates to the art of electric arc welding and more particularly to arc welding apparatus of the type embodying a continuously moving, consumable electrode wire which is fed from a supply reel or the like, in a guided path, to the associated work, and to which is conducted a high amperage current sufficient to establish an arc between the end portion of the electrode wire and an associated workpiece. More specifically, the present invention deals with an improved electrical contactor device or feed nozzle for electric arc welding apparatus of this character which is arranged to conduct electrical current directly to the continuously moving electrode wire and to impress such current upon the wire at a position closely adjacent an associated workpiece and the weld area.

There are in present day usage several makes or brands of electrical arc welding machines of the continuously feeding, consumable electrode type, wherein a substantially continuous supply of metallic wire is fed through a tube-like nozzle or contactor and discharged therefrom in a free end portion disposed closely adjacent to the work to be welded. Such tube-like nozzles or contactors generally comprise a straight length of metallic, electrically conductive, tubing carried in association with a suitable hand-held pistol grip or handle device which may be manipulated so as to direct the free end of the electrode wire into proper juxtaposition with the work. The tube-like nozzle or contactor is electrically connected with one pole of a current-supply source, such as a generator, while the opposite pole, or ground terminal, of the power supply source is electrically connected with the work to be welded. The function or purpose of the tube-like contactor is to directly conduct high amperage current from the associated current supply source to the electrode wire, at a position thereon as closely adjacent the consumable free end portion of the wire as is practicable, and during continuous movement of the electrode wire through the contactor tube.

It will be understood by those skilled in the art that during the ordinary operation of machines of this type, the electrode wire may oftentimes be fed and consumed at the rate of several hundred inches per minute, and that the feed of such electrode wire is accomplished by means of suitable power-driven feed rollers, or the like, which serve to withdraw the wire from a remotely located supply reel or roll and advance the same at a relatively high rate of linear travel through a suitable system of guide tubes to and through the contactor tube or nozzle of the welding gun to be constantly consumed at the point or area of the weld. Oftentimes, such machines also embody a source of inert gas which is conducted and discharged through suitable hoses or tubes to the work so as to establish a non-oxidizing atmosphere in surrounding relation to the weld.

In the past, considerable difficulty has been encountered with welding equipment of this character due to arcing and consequent seizure between the electrode wire and the inner surface of the metallic nozzle or contactor tube element of the welding gun. Such arcing usually results when the electrode wire, during its movement through the nozzle or contactor tube, becomes physically spaced from the interior surface of the contactor tube, or the area of contact between the electrode wire and the contactor tube is reduced to such an extent that the reduced area of contact is insufficient to transmit the volume of current imposed thereon. Arcing and seizure of the electrode wire within the contactor tube of the welding gun generally results in what is termed a "burn back" which necessitates a dismantling of the gun, a replacement of the contactor tube, the associated feed rolls, the dielectric guide tube for the electrode wire and a complete reassembly of such elements before welding operations may be resumed. Needless to say, such "burn backs" result in considerable loss of time and materials and add greatly to the costs of welding operations.

As ordinarily constituted, the contactor tube or nozzle element of these machines consists of a relatively short, rigid length of copper or other conductive metallic tubing formed with a comparatively small diameter axial bore slightly larger than the diameters of electrode wires which are intended to be fed through the bore of the tube. The relative sizes or diameters of the bore of the contactor tube and the electrode wire is such as to permit free linear sliding movement of the electrode wire through the bore, and to avoid undue frictional engagement between the electrode wire and the inner surfaces of the contactor tube, such as would tend to cause the electrode wire to buckle and bend between the associated feed rolls and the contactor tube with resultant stoppage of the feed of the electrode wire through the contactor tube. Ordinarily, the electrode wire which is fed to the contactor tube is slightly bent or curved longitudinally, due to its tangential withdrawal from the associated supply reel or roll and its passage through the feed rolls. This inherent longitudinal bend or cast in the electrode wire results in a substantial maximum three-point contact between the electrode wire and the straight inner cylindrical wall surface of the contactor tube as the electrode wire passes through the relatively diametrically enlarged bore of the tube. In other words, due to the slight arcuate bend of the electrode wire and the straight longitudinal configuration of the bore of the contactor tube coupled with the relatively larger diameter of the bore with respect to the diameter of the wire, the electrode wire normally makes contact with the contactor tube only at three points, namely, at the entrance and exit ends of the tube and at a single point intermediate the tube. As will be understood, the electrode wire possesses an inherent flexibility or resiliency, and oftentimes during linear travel thereof through the contactor tube, the wire will flex in a manner to reduce its points of contact with the contactor tube to a point where maybe only one point on the wire touches the tube, or in extreme case where there is an instantaneous complete spacing between the electrode wire and the tube. In such instances, arcing occurs due to gapping or spacing between the surfaces of the wire and the contactor tube, or due to the fact that the current density per area of contact between the tube and wire becomes of such magnitude that the limited area of contact between the tube and wire cannot actually absorb or transmit the current impressed thereon. As previously stated, such arcing between the electrode wire and the contactor tube results in seizure and stoppage of the wire and a "burn back" with resultant damage to the welding gun and its ambient parts.

Accordingly, it is the primary object of this invention to provide an improved and efficient electrode contactor device for continuous feed, consumable electrode-type welding machines which greatly minimizes, if not prevents, the possibility of arcing and consequent seizure between the electrode wire and gun elements of such machines and the attendant difficulties encountered with prior art machines or apparatus of this type.

Another object of the present invention is to provide a contactor device of this character which may be conveniently installed and used in combination with present day welding machines or apparatus of this type without necessitating complicated structural modification to the major components of such machines.

A further object of this invention is to provide an electrical contactor device for continuous feed, consumable electrode-type welding apparatus which is so constructed as to effectively insure a materially increased area of contact and current transmission between the continuously movable electrode wire and the contactor device as compared with prior art contactor tubes or nozzle constructions.

Yet another object of the present invention is to provide an electrical contactor device of the foregoing character which takes the form of a generally tubular electrically conductive body having passage means therethrough for the passage of a continuously movable electrode wire and wherein said passage means is defined by a plurality of interrupted or angularly related electrically conductive surfaces arranged so as to engage and maintain a substantially large area of electrical contact with an associated electrode wire during linear passage of the latter through said contactor device, while at the same time maintaining the level of frictional drag upon the electrode wire at a desired minimum.

For a further and more complete understanding of the present invention and the various additional objects and advantages thereof, reference is made to the following description and the accompanying drawing, wherein:

Fig. 1 is a diagrammatic view illustrating schematically the components of a continuous feed, consumable electrode-type arc welding apparatus formed in accordance with the prior art;

Fig. 2 is an enlarged longitudinal vertical sectional view taken through an improved contactor tube device formed in accordance with the present invention;

Fig. 3 is a transverse vertical sectional view taken along the line 3—3 of Fig. 2;

Fig. 4 is a fragmentary side elevational view of still another modified form of the present contactor device;

Fig. 5 is a transverse vertical sectional view taken along the line 6—6 of Fig. 4.

Referring now to Fig. 1 of the drawing, for the purpose of affording a ready understanding of the difficulties attendant to prior art devices and to facilitate an explanation of the present improved contactor device, there is illustrated schematically a continuous feed, consumable electrode-type arc welding apparatus formed in accordance with the prior art. In Fig. 1, the numeral 10 designates generally the cylindrical contactor tube or nozzle member of the welding gun which is formed from any suitable electrically conductive metal or metallic alloy, such as copper. The conductor tube 10 is advantageously supported in association with a pistol grip-type handle device 11 so as to be manually manipulated and moved with relation to the work or workpiece 12 to be welded. The tubular contactor body 10 is electrically connected with one pole of a suitable source of electrical energy, such as the welding generator G, as by means of a suitable flexible, insulated lead wire 13. In the usual manner, the opposite pole of the power source or generator G is grounded as at 14, while the work 12, to be welded, is likewise grounded, as at 15, in order to complete a high amperage welding circuit through an arc formed between the outer end portion 16 of a continuously moving electrode wire 17 and the work 12.

The contactor tubes 10 of the prior art are generally formed with an axially extending cylindrical bore or passage 18 through which the free end portion of the electrode wire 17 is fed and electrically charged by direct contact or engagement with the inner wall surface of the tube 10. In the usual manner, a continuous length of the electrode wire 17 is maintained upon a rotatable supply reel 19 positioned remotely with respect to the hand-operated gun structure, and arranged between the supply reel of electrode wire and the manually operable gun device are a pair of power driven feed rolls 20 which function to forcibly feed the electrode wire 17 from the supply reel 19 through the bore or passage 18 of the contactor tube 10 to the work 12. In the usual manner, the intermediate portion of the electrode wire 17, located between the feed rolls 20 and the hand-operated gun device is guided through a suitable flexible, dielectric, synthetic resin guide tube 21 which serves the dual capacity of insulating the electrode wire 17 and in guiding the same linearly between the feed rolls 20 and the gun device.

As illustrated in Fig. 1, the electrode wire 17 possesses a slight longitudinal cast, set or curvature due to the tangential unwinding of the wire from the supply reel 19 and its passage through the feed rolls 20. While the bore or passage 18 which extends through the contactor tube 10 is of relatively small diameter, nevertheless, the diameter of the passage 18 is considerably larger than the outer diameter of electrode wires 17 adapted to be passed therethrough upon operation of the feed rolls 20. Consequently, due to the differential in diameters between the passage 18 of the conductor tube 10 and the diameter of the wire 17, coupled with the inherent longitudinal curvature of the electrode wire, the latter makes substantially only three-point contact with the interior wall surface of the conductor tube 10 during its passage through the bore 18.

It will here be understood that the contactor tube or nozzle 10 of the prior art is constituted by a relatively rigid tubular metallic body in which the bore 18 extends straight through the body from end to end thereof. Thus, it will be seen that the slight arcuate curvature of the electrode wire 17 causes the same normally to make point contact with the interior surfaces of the contactor tube 10 only at the entrance and exit ends of the tube, as illustrated at points A and B of Fig. 1, and at substantially a midway point C therein. However, due to the inherent flexibility or resiliency of the electrode wire 17, the same oftentimes, during its relatively high speed linear travel through the bore or passage 18, flexes or straightens in a manner to separate its normal points of contact with the tube body, thus diminishing the total area of contact between the electrode wire 17 and the tube body 10 to such an extent that the current density per square inch of contact area becomes so great that arcing occurs within the bore or passage 18, thus seizing the electrode wire 17 and causing a stoppage of the feed of the electrode wire through the contactor tube 10. This stoppage in the feed of the electrode wire 17, while the same is energized, results immediately in a "burn back" of the wire from the weld area to the contact tube 10 and the destruction of the tube 10, the associated plastic guide tubing 21 and even the feed rolls 20. As will be readily appreciated by those skilled in the art, these so-called "burn backs" are not at all uncommon in daily welding operations utilizing welding equipment of this nature, and have become a common source of expense and difficulty attendant to the use of continuous feed, consumable electrode-type welding apparatus. Furthermore, the contactor tubes or nozzles 10 of the prior art are comparatively expensive to fabricate due to the formation of the relatively small diameter axial passage therein which requires special drawing or drilling of the tube body in its formation.

In accordance with the present invention, I provide a contactor tube or nozzle construction which functions to greatly minimize, if not prevent, the possibility of arcing between the electrode wire and the body of the contactor device and the subsequent expense and hazards attendant to such arcing. Toward this end, one form of the present improved contactor device, as illustrated in Figs. 2 and 3 of the drawing, comprises an outer tubular body 24 formed from ordinary copper tubing or other suitable electrically conductive metals or metallic alloys. Advantageously, the tubular body 24 may consist of standard, readily available commercial tubing having the usual relatively thin wall cross section. The axial passage or bore of the outer tube body 24 is substantially filled with a multiplicity of relatively fine, small diameter copper, or other electrically conductive metallic wires 25 which extend generally parallel to the axis of the outer tubular body 24. Advantageously, the wires 25, at one end thereof, may be bent backwardly, as at 26, over the entrance end of the outer tube 24, and securely fastened to the entrance end of the outer tube 24, as by soldering at 27. The opposite or exit ends of the small wire strands 25 terminate substantially flush with the exit end of the outer tube 24, and preferably are not rigidly connected with the exit end of the tube. Thus, the multiplicity of individual relatively fine wire strands 25 extend generally axially of and substantially fill the interior of the tube body 24, but are sufficiently loosely arranged therein, so as to provide for the axial passage of the electrode wire 17 through the tube body without causing undue frictional resistance to the linear travel of the electrode wire. At the same time, due to the relatively small size and flexible nature of the interior strands or wires 25 and the substantially parallel disposition thereof with respect to the path of travel of the electrode wire 17, the strands 25 closely hug and contact the electrode wire 17 over a materially greater area than has heretofore been accomplished with the prior art contactor devices consisting only of the straight, substantially rigid tube body 10, as illustrated in Fig. 1.

High amperage welding current is conducted from the power source, or generator G, through the lead wire or cable 13 which, advantageously, is electrically joined, as by soldering, with the entrance ends of the bundle of wires 25, whereby current will be immediately conducted to the mass of relatively small wire strands 25 and thence to substantially the full outer surface area of the electrode wire 17 passing through the contactor device. Hence, the electrode wire 17 may flex or move to a limited extent in a radial direction with respect to the contactor body, and will, at the same time, be always maintained in electrically conductive contact with at least a plurality of the fine wire strands 25, due to the ability of such wire strands to flex and closely hug and contact the outer surface of the electrode wire as the latter moves through the mass of wires 25.

Figs. 4 and 5 of the drawing illustrate a modified form of contactor device somewhat similar in its construction to that disclosed in Figs. 2 and 3, but wherein the substantially rigid or inflexible outer tubular casing 24 of Fig. 2 is replaced by a flexible outer casing 24b formed from braided copper wire or the like. The braided outer casing 24b may be substantially filled with the relatively fine wire strands 25 which are, in and of themselves, readily flexible, to thus provide a contactor device possessing overall flexibility and one which may be easily bent or manipulated relative to the associated pistol grip or handle device so as to more conveniently accommodate the same to various types of work wherein flexibility on the part of the contactor device is desirable. Due to the inherent flexibility and compressibility of the outer tubular body 24b and its rough, interrupted, braided surfaces, the same lends itself particularly well to large area contact with the electrode wire 17 and the individual fine wire strands 25 which, in turn, closely hug and intimately contact the electrode wire 17 throughout substantially the full outer surface area thereof. Here, again, the contactor device of Figs. 4 and 5 defines a non-circular resiliently deformable passage for the electrode wire 17 which is constituted by a plurality of relatively interrupted, angularly related surfaces.

As will be understood, the outer tubular casing elements 24, and 24b may, if desired, be replaced by any mechanically equivalent retainer means (either electrically conductive or dielectric) which functions to hold the inner electrode-contacting wires, strands or segments in their desired relatively interrupted angularly related positions, provided that the current conducting lead 13 is properly electrically connected with such inner wires, strands or segments.

In view of the foregoing, it will be seen that the present invention provides an electrical contactor device for the electrode element of continuous feed, consumable electrode-type welding apparatus which is characterized by its ability to maintain a substantially large area of contact and current transmission, with a minimum of frictional resistance, between the contactor device and the electrode wire during passage thereof through the gun element of the welding apparatus, to thus greatly minimize and prevent undersired arcing between the electrode wire and the contactor device. Contactor devices formed in accordance with the present invention may be readily installed upon and operated in combination with the usual standard components of continuous feed, consumable electrode-type welding machines, merely by replacing the usual rigid contactor tube or barrel element of such machines with the present improved contactor device. Further, the present contactor devices utilize more or less standard and readily available component parts and may therefore be fabricated economically as compared with the drawn or bored contactor tubes of the prior art.

While I have disclosed in detail certain specific embodiments of the present invention, it will be understood that various additional modifications as to details of construction and design may be resorted to without departing from the spirit of the invention or the scope of the following claim.

I claim:

An electrical contactor device for continuous feed, consumable electrode-type welding apparatus comprising an outer tubular casing formed with an axial passage extending therethrough; a plurality of resiliently flexible electrically conductive wire strands positioned within and extending longitudinally of the passage of said casing and defining therein a resiliently deformable electrode passage of non-circular cross section; and means connecting said wire strands to said casing only at one end thereof and providing limited transverse flexing movement of said strands substantially throughout their lengths in response to forces applied to said strands during travel of an electrode wire longitudinally through the passage of said casing.

References Cited in the file of this patent

UNITED STATES PATENTS

| | | |
|---|---|---|
| 2,093,394 | Emery | Sept. 14, 1937 |
| 2,360,743 | Tuttle | Oct. 17, 1944 |
| 2,694,130 | Howard | Nov. 9, 1954 |